US011313241B2

(12) United States Patent
Tejero Embuena et al.

(10) Patent No.: US 11,313,241 B2
(45) Date of Patent: Apr. 26, 2022

(54) NACELLE FOR A GAS TURBINE ENGINE

(71) Applicant: ROLLS-ROYCE plc, London (GB)

(72) Inventors: Fernando L. Tejero Embuena, Bedford (GB); David G. Macmanus, Olney (GB); Christopher T J Sheaf, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 17/084,821

(22) Filed: Oct. 30, 2020

(65) Prior Publication Data

US 2021/0164356 A1 Jun. 3, 2021

(30) Foreign Application Priority Data

Nov. 29, 2019 (GB) ..................................... 1917415

(51) Int. Cl.
*F01D 25/24* (2006.01)
*F01D 9/04* (2006.01)
*F02C 7/04* (2006.01)

(52) U.S. Cl.
CPC .............. *F01D 9/04* (2013.01); *F01D 25/24* (2013.01); *F02C 7/04* (2013.01); *F05D 2220/32* (2013.01);
(Continued)

(58) Field of Classification Search
CPC ... F01D 9/04; F01D 25/24; F02C 7/04; F05D 2220/32; F05D 2240/12; F05D 2240/14
See application file for complete search history.

(56) References Cited

U.S. PATENT DOCUMENTS 4,220,171 A * 9/1980 Ruehr .................... B64D 33/02
137/15.1
4,722,357 A * 2/1988 Wynosky ............... B64D 33/02
137/15.1
(Continued)

FOREIGN PATENT DOCUMENTS

EP 3 171 002 A1 5/2017
EP 3287371 A1 2/2018
GB 2259115 A 3/1993

OTHER PUBLICATIONS

Mar. 31, 2021 Extended European Search Report issued in European Patent Application No. 20206405.1.
(Continued)

*Primary Examiner* — J. Todd Newton
*Assistant Examiner* — Theodore C Ribadeneyra
(74) *Attorney, Agent, or Firm* — Oliff PLC

(57) ABSTRACT

A nacelle for a gas turbine engine having a longitudinal centre line includes an intake lip disposed at an upstream end of the nacelle. The intake lip includes a crown and a keel. The crown includes a crown leading edge and the keel includes a keel leading edge. The crown leading edge and the keel leading edge define a scarf line therebetween. The scarf line forms a scarf angle ($\theta_{scarf}$) relative to a reference line perpendicular to the longitudinal centre line. A fan casing is disposed downstream of the intake lip and includes a casing leading edge. The casing leading edge defines a droop line normal to the casing leading edge. The droop line forms a droop angle ($\theta_{droop}$) relative to the longitudinal centre line. A relationship between the droop angle ($\theta_{droop}$) and the scarf angle ($\theta_{scarf}$) is given by: $\theta_{droop} = \theta_{scarf}/1.5 \pm 1$ degree.

9 Claims, 7 Drawing Sheets

(52) U.S. Cl.
CPC ...... *F05D 2240/12* (2013.01); *F05D 2240/14* (2013.01)

(56) References Cited

U.S. PATENT DOCUMENTS

| | | | |
|---|---|---|---|
| 5,058,617 A | | 10/1991 | Stockman et al. |
| 5,702,231 A | * | 12/1997 | Dougherty .............. F02C 7/045 |
| | | | 415/119 |
| 5,915,403 A | | 6/1999 | McConachie et al. |
| 6,708,711 B2 | * | 3/2004 | Surply ................... B64D 33/02 |
| | | | 137/15.1 |
| 7,735,776 B2 | * | 6/2010 | Chanez ................... F02C 7/045 |
| | | | 244/53 B |
| 7,797,944 B2 | * | 9/2010 | Morford ................... F02K 1/06 |
| | | | 60/771 |
| 8,769,924 B2 | * | 7/2014 | Cloft ........................ F02C 7/05 |
| | | | 60/226.1 |
| 9,810,178 B2 | * | 11/2017 | Dindar .................... F01D 25/24 |
| 9,885,285 B2 | * | 2/2018 | Mosley ..................... F02K 3/06 |
| 9,920,653 B2 | * | 3/2018 | Lord ........................ F01D 5/02 |
| 10,479,519 B2 | * | 11/2019 | Qiu ......................... B64D 27/10 |
| 10,501,196 B2 | * | 12/2019 | Ramakrishnan ....... B64D 29/04 |
| 2016/0003145 A1 | * | 1/2016 | Qiu ........................... F02K 3/06 |
| | | | 60/726 |
| 2017/0145916 A1 | * | 5/2017 | Stuart ..................... F02K 3/068 |
| 2018/0057181 A1 | | 3/2018 | Yao et al. |

OTHER PUBLICATIONS

Search Report issued in British Patent Application No. 1917415.0.

\* cited by examiner

NACELLE FOR A GAS TURBINE ENGINE

CROSS-REFERENCE TO RELATED APPLICATIONS

This specification is based upon and claims the benefit of priority from United Kingdom patent application number GB 1917415.0 filed on Nov. 29, 2019, the entire contents of which is incorporated herein by reference.

BACKGROUND

Field of the Disclosure

The present disclosure relates to a nacelle and in particular to a nacelle for a gas turbine engine.

Description of the Related Art

A gas turbine engine includes a fan housed within a nacelle. Current gas turbine engines generally have a low specific thrust to keep noise at acceptable levels and to achieve low fuel consumption, because a low specific thrust helps to improve specific fuel consumption (SFC). This low specific thrust is usually achieved with a high bypass ratio. Therefore, as the specific thrust reduces, there is a concomitant increase in fan diameter. In order to accommodate a larger diameter fan, dimensions of the nacelle may have to be increased proportionally. This typically results in a nacelle having increased drag and mass. Increase in drag and mass of the nacelle may both result in an increase in fuel consumption.

SUMMARY

The present disclosure provides a nacelle for a gas turbine engine and a gas turbine engine.

According to a first aspect, there is provided a nacelle for a gas turbine engine having a longitudinal centre line. The nacelle includes an intake lip disposed at an upstream end of the nacelle. The intake lip includes a crown and a keel. The crown includes a crown leading edge and the keel includes a keel leading edge. The crown leading edge and the keel leading edge define a scarf line therebetween. The scarf line forms a scarf angle $\theta_{scarf}$ relative to a reference line perpendicular to the longitudinal centre line. The nacelle further includes a fan casing disposed downstream of the intake lip and includes a casing leading edge. The casing leading edge defines a droop line normal to the casing leading edge. The droop line forms a droop angle $\theta_{droop}$ relative to the longitudinal centre line. A relationship between $\theta_{droop}$ and $\theta_{scarf}$ is defined by: $\theta_{droop} = \theta_{scarf}/1.5 \pm 1$ degree.

The nacelle according to the first aspect may have a non-axisymmetric configuration due to the incorporation of droop and scarf based on the above relationship between the droop angle $\theta_{droop}$ and the scarf angle $\theta_{scarf}$. The nacelle with the non-axisymmetric configuration may incur minimised drag during an operation of an aircraft it is attached to. This may allow the aircraft including the nacelle to generate reduced engine noise and consume less fuel during its operation. The nacelle with reduced drag may be used to accommodate a fan with a larger diameter. Further, the nacelle can be used with a gas turbine engine having high bypass ratio.

In some embodiments, an effective incidence angle of attack $\alpha$ is defined relative to the longitudinal centre line. A relationship between $\theta_{scarf}$ and $\alpha$ is defined by: $\theta_{scarf} = \alpha \pm 1$ degree.

The above relationship between the droop angle $\theta_{droop}$ and the effective incidence angle of attack $\alpha$ may further reduce the drag on the nacelle.

In some cases, a combination of the above relationship between the droop angle $\theta_{droop}$ and the scarf angle $\theta_{scarf}$, and the above relationship between the droop angle $\theta_{droop}$ and the effective incidence angle of attack $\alpha$ may provide an optimal region of the droop angle $\theta_{droop}$ and the scarf angle $\theta_{scarf}$ where the drag on the nacelle is minimised.

In some embodiments, the crown leading edge is axially forward of the keel leading edge relative to the longitudinal centre line.

In some embodiments, the keel leading edge is axially forward of the crown leading edge relative to the longitudinal centre line.

In some embodiments, the intake lip further includes an outer surface, an inner surface and a highlight forming a boundary between the outer surface and the inner surface. The highlight includes the crown leading edge and the keel leading edge.

In some embodiments, the nacelle further includes an engine casing disposed downstream of the intake lip.

In some embodiments, the nacelle further includes a diffuser disposed between the upstream end and the fan casing.

In some embodiments, the nacelle further includes an exhaust disposed at a downstream end of the nacelle.

In a second aspect, there is provided a gas turbine engine for an aircraft. The gas turbine engine includes a nacelle according to the first aspect. The gas turbine engine further includes a fan received within a fan casing of the nacelle and a core engine received within the nacelle.

As noted elsewhere herein, the present disclosure may relate to a gas turbine engine. Such a gas turbine engine may comprise a core engine comprising a turbine, a combustor, a compressor, and a core shaft connecting the turbine to the compressor. Such a gas turbine engine may comprise a fan (having fan blades) located upstream of the core engine.

According to an aspect, there is provided an aircraft comprising a gas turbine engine as described and/or claimed herein. The aircraft according to this aspect is the aircraft for which the gas turbine engine has been designed to be attached.

According to an aspect, there is provided a method of operating a gas turbine engine as described and/or claimed herein.

According to an aspect, there is provided a method of operating an aircraft comprising a gas turbine engine as described and/or claimed herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which:

FIG. 2a is a schematic perspective view of a nacelle of the gas turbine engine in accordance with an embodiment of the present disclosure;

FIG. 2b is a schematic sectional side view of the nacelle taken along a longitudinal centre line in FIG. 2a;

DETAILED DESCRIPTION OF THE DISCLOSURE

Aspects and embodiments of the present disclosure will now be discussed with reference to the accompanying figures. Further aspects and embodiments will be apparent to those skilled in the art.

Figure 1:
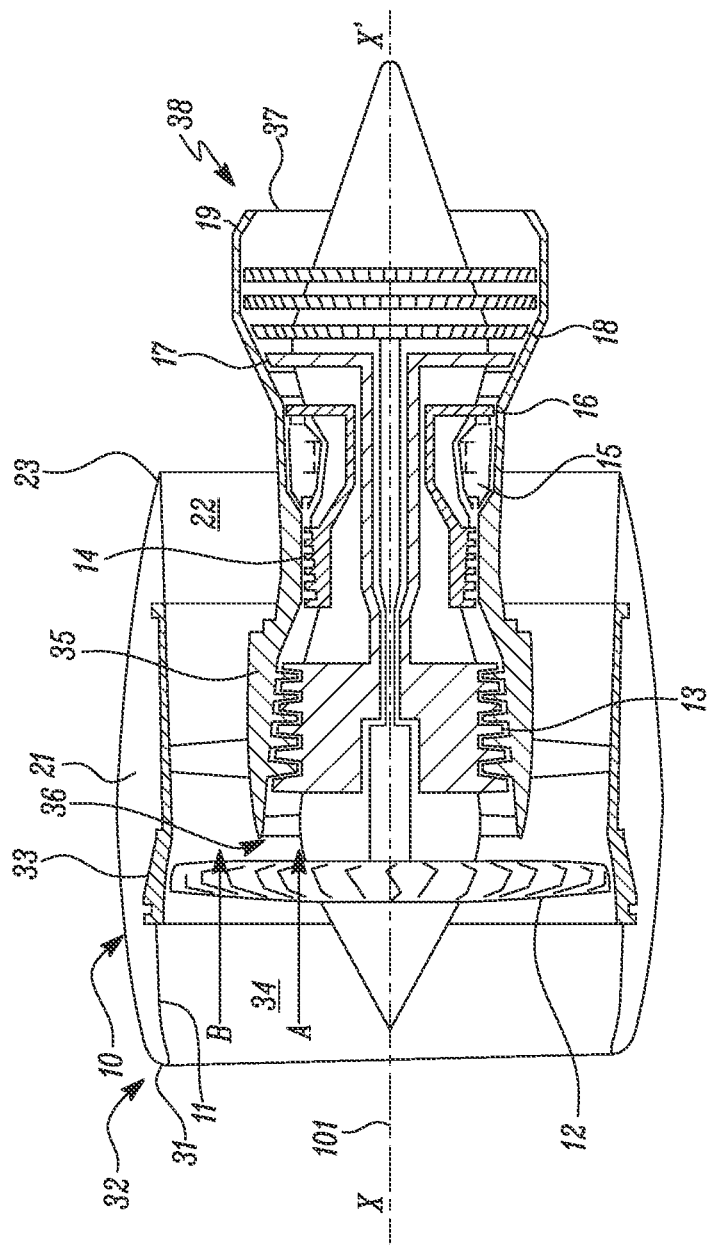
FIG. 1 is a sectional side view of a gas turbine engine.

FIG. 1 shows a ducted fan gas turbine engine 10 having a principal rotational axis X-X'. The principal rotational axis X-X' coincides with a longitudinal centre line 101 of the gas turbine engine 10.

In the following disclosure, the following definitions are adopted. The terms "upstream" and "downstream" are considered to be relative to an air flow through the gas turbine engine 10. The terms "axial" and "axially" are considered to relate to the direction of the principal rotational axis X-X' of the gas turbine engine 10.

The gas turbine engine 10 includes, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the gas turbine engine 10 and defines the air intake 11, a bypass duct 22 and a bypass exhaust nozzle 23.

During operation, air entering the air intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the first air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the core engine exhaust nozzle 19 to provide additional propulsive thrust. The high, intermediate and low-pressure turbines 16, 17, 18 respectively drive the high and intermediate pressure compressors 14, 13 and the fan 12 by suitable interconnecting shafts.

In some embodiments, the gas turbine engine 10 is used in an aircraft. In some embodiments, the gas turbine engine 10 is an ultra-high bypass ratio engine (UHBPR).

The nacelle 21 further includes an intake lip 31 disposed at an upstream end 32 of the nacelle 21, a fan casing 33 downstream of the intake lip 31, a diffuser 34 disposed between the upstream end 32 and the fan casing 33, and an engine casing 35 downstream of the intake lip 31. The fan 12 is received within the fan casing 33. A core engine 36 of the gas turbine engine 10 including the intermediate pressure compressor 13, the high-pressure compressor 14, the combustion equipment 15, the high-pressure turbine 16, the intermediate pressure turbine 17, the low-pressure turbine 18 and the core engine exhaust nozzle 19 is received within the nacelle 21. Specifically, the core engine 36 is received within the engine casing 35. The nacelle 21 further includes an exhaust 37 disposed at a downstream end 38 of the nacelle 21. The exhaust 37 may be part of the part of the engine casing 35. The exhaust 37 may at least partly define the core engine exhaust nozzle 19.

The nacelle 21 for the gas turbine engine 10 may be typically designed by manipulating a plurality of design variables. The selection of the design variables may be dependent on a cruise Mach speed of an aircraft the nacelle 21 is attached to, as well as considerations for integration of engine ancillaries, such as a thrust reversal unit (TRU). Optimisation of these variables may be required to minimise the cruise drag incurred due to size and design of the nacelle 21.

Figures 2A, 2B:
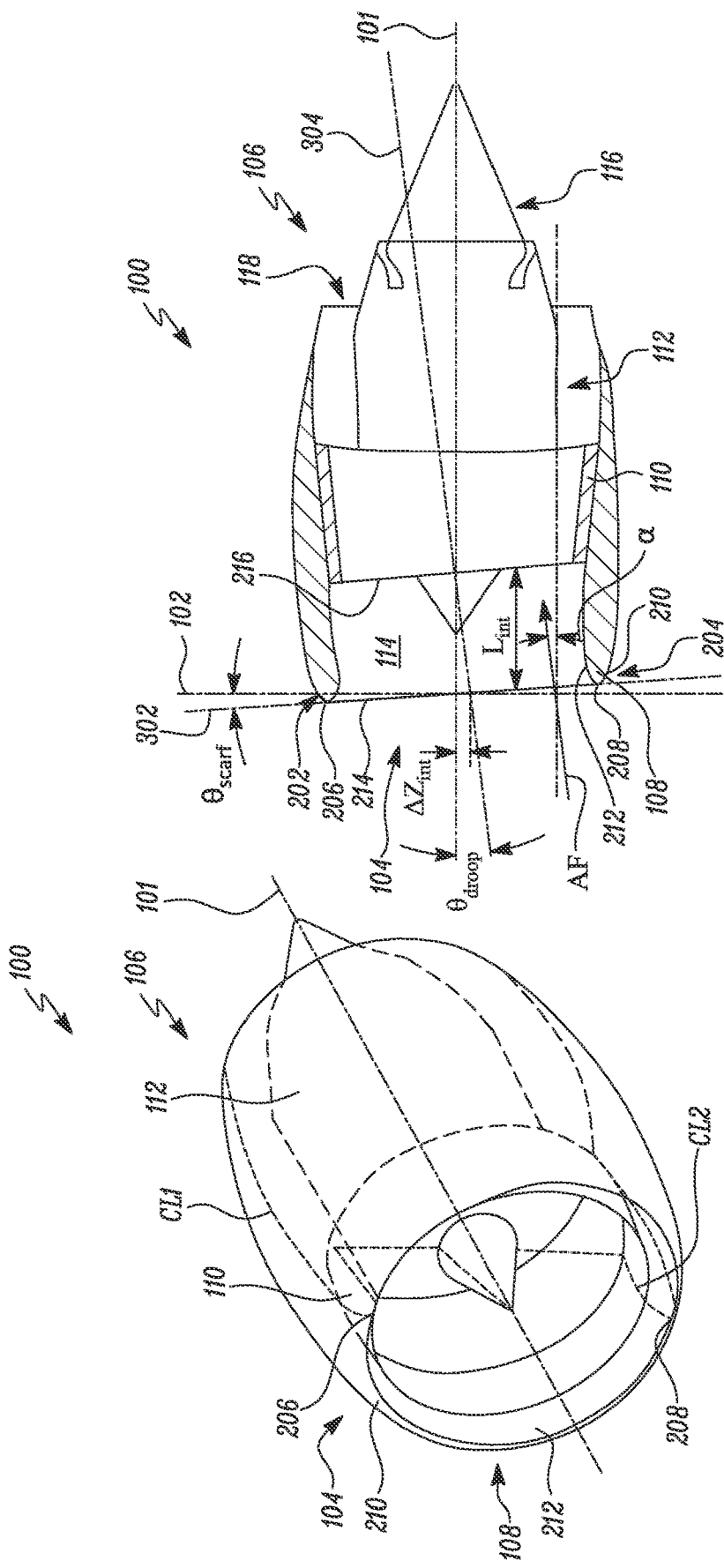

FIGS. 2a and 2b illustrate a nacelle 100 for the gas turbine engine 10 (shown in FIG. 1) having the longitudinal centre line 101 in accordance with an embodiment of the present disclosure. The nacelle 100 may be formed using any suitable material. for example, the nacelle 100 may formed as a metal forging, with the metal being selected from the group comprising steel, titanium, aluminium and alloys thereof. Optionally, the nacelle 100 may be formed from a fibre reinforced composite material, with the composite fibre being selected from the group comprising glass, carbon, boron, aramid and combinations thereof. An advantage of using a fibre reinforced composite material to form the nacelle 100 is that its weight may be reduced over a nacelle formed from a metallic material.

As shown in FIG. 1, the longitudinal centre line 101 coincides with the principal rotational axis X-X' of the gas turbine engine 10. The nacelle 100 further includes a reference line 102 perpendicular to the longitudinal centre line 101. The longitudinal centre line 101 is also illustrated in FIGS. 2a and 2b.

Referring to FIGS. 1, 2a and 2b, the nacelle 100 generally has a tubular structure including an upstream end 104 and a downstream end 106 opposite to the upstream end 104. The nacelle 100 includes an intake lip 108 disposed at the upstream end 104 of the nacelle 100, a fan casing 110 disposed downstream of the intake lip 108, an engine casing 112 disposed downstream of the intake lip 108, a diffuser 114 disposed between the upstream end 104 and the fan casing 110, and an exhaust 116 disposed at the downstream end 106 of the nacelle 100. The fan 12 of the gas turbine engine 10 is received within the fan casing 110. Specifically, the fan casing 110 surrounds the fan 12. The core engine 36 of the gas turbine engine 10 is received within the nacelle 100. Specifically, the core engine 36 is received within the engine casing 112. The engine casing 112 surrounds the core engine 36.

The nacelle 100 is generally terminated by the exhaust 116 whose outlet is located downstream of the core engine 36. The exhaust 116 may exhaust the resultant hot combustion products from the combustion equipment 15 of the gas turbine engine 10. The nacelle 100 may include a cowling disposed proximal to the downstream end 106. The cowling may be able to accommodate ancillaries, such as a TRU. The TRU may be any type, for example, target type, clam-shell type or cold stream type.

The nacelle 100 further includes a bypass nozzle 118 disposed proximal to the downstream end 106. The bypass nozzle 118 may exhaust the bypass air.

The intake lip 108 and the diffuser 114 may form an air intake to supply air to the fan 12 of the gas turbine engine 10 during operation of the gas turbine engine 10. The air intake may be further required to absorb noise generated by the gas turbine engine 10. The diffuser 114 may be sized and configured for reducing velocity of the airflow while increasing its static pressure.

The intake lip 108 includes a crown 202 and a keel 204. The intake lip 108 includes a top portion and a bottom portion defining the crown 202 and the keel 204, respectively. The crown 202 and the keel 204 may be disposed at diametrically opposite control lines of the nacelle 100. Control lines are imaginary lines disposed at respective angles relative to the longitudinal centre line 101. The crown 202 may correspond to a 0 degree (°) control line CL1, while the keel 204 may correspond to a 180° control line CL2. The crown 202 includes a crown leading edge 206 at an extreme upstream edge of the crown 202. Similarly, the keel 204 includes a keel leading edge 208 at an extreme upstream end of the keel 204. In the illustrated embodiment of FIGS. 2a and 2b, the crown leading edge 206 is axially forward of the keel leading edge 208 relative to the longitudinal centre line 101. However, in alternative embodiments, the keel leading edge 208 may be axially forward of the crown leading edge 206 relative to the longitudinal centre line 101.

The intake lip 108 further includes an outer surface 210, an inner surface 212 and a highlight 214 forming a boundary between the outer surface 210 and the inner surface 212. The highlight 214 may define an annular upstream edge of the nacelle 100. The highlight 214 includes the crown leading edge 206 and the keel leading edge 208. The highlight 214 may define a highlight radius of the nacelle 100. The inner surface 212 and the outer surface 210 may define a radius of curvature of the intake lip 108. In some embodiments, the nacelle 100 may include one or more acoustic liners (not shown) provided on the inner surface 212 of the intake lip 108.

The nacelle 100 channels a freestream airflow AF into the gas turbine engine 10 for combustion and generation of thrust. An effective incidence angle of attack α is defined relative to the longitudinal centre line 101 of the gas turbine engine 10. Specifically, the effective incidence angle of attack α is defined between the freestream airflow AF and the longitudinal centre line 101. The effective incidence angle of attack α may depend on an operational state of an aircraft including the gas turbine engine 10. During a cruise operation of the aircraft including the gas turbine engine 10, the effective incidence angle of attack α may be positive and typically greater than zero degree.

The fan casing 110 is disposed downstream of the intake lip 108. The fan casing 110 includes a casing leading edge 216. The casing leading edge 216 may be an upstream edge of the fan casing 110 facing the intake lip 108. The nacelle 100 defines an intake length $L_{int}$ defined between the highlight 214 and the casing leading edge 216. The intake length $L_{int}$ may be defined along the longitudinal centre line 101.

The crown leading edge 206 and the keel leading edge 208 define a scarf line 302 therebetween. Specifically, the scarf line 302 is a straight line that joins the crown leading edge 206 and the keel leading edge 208. The scarf line 302 forms a scarf angle $\theta_{scarf}$ relative to the reference line 102 perpendicular to the longitudinal centre line 101. The scarf angle $\theta_{scarf}$ is indicative of an axial offset between the crown leading edge 206 and the keel leading edge 208 relative to the longitudinal centre line 101. A positive value of the scarf angle $\theta_{scarf}$ may correspond to the crown leading edge 206 being axially forward of the keel may leading edge 208. On the other hand, a negative value of the scarf angle $\theta_{scarf}$ may correspond to the keel leading edge 208 being axially forward of the crown leading edge 206.

Some advantages of scarfing may include noise reduction, improved foreign object damage resistance, and improved keel high incidence angle of attack performance.

The casing leading edge 216 defines a droop line 304 normal to the casing leading edge 216. The droop line 304 forms a droop angle $\theta_{droop}$ relative to the longitudinal centre line 101. The droop angle $\theta_{droop}$ is indicative of an inclination of the casing leading edge 216 of the fan casing 110 relative to the longitudinal centre line 101. Due to the inclination of the casing leading edge 216, an intake offset $\Delta Z_{int}$ is defined between the droop line 304 and the longitudinal centre line 101 at the upstream end 104 of the nacelle 100. Specifically, the intake offset $\Delta Z_{int}$ is a vertical offset between the droop line 304 and the longitudinal centre line 101 measured along the reference line 102 at the highlight 214. A relationship between the droop angle $\theta_{droop}$, the intake length $L_{int}$ and the intake offset $\Delta Z_{int}$ is defined by the following equation:

$$\theta_{droop} = \operatorname{atan}\left(\frac{\Delta Z_{int}}{L_{int}}\right) \qquad \text{[Equation 1]}$$

Some advantages of drooping may include improved low speed high incidence angle of attack performance.

In some embodiments, the droop angle $\theta_{droop}$ is related to the scarf angle $\theta_{scarf}$. For a range of configurations of a nacelle with different values of the scarf angle $\theta_{scarf}$ and the droop angle $\theta_{droop}$, a set of multi-objective optimisation (MOO) may be carried out to identify an optimum relationship between the scarf angle $\theta_{scarf}$ and the droop angle $\theta_{droop}$. A nacelle with minimum drag may be obtained based on the relationship between the droop angle $\theta_{droop}$ and the scarf angle $\theta_{scarf}$.

The relationship between the droop angle $\theta_{droop}$ and the scarf angle $\theta_{scarf}$ is defined by the following equation:

$$\theta_{droop} = \theta_{scarf}/1.5 \pm 1° \qquad \text{[Equation 2]}$$

A nacelle with minimum drag may further be obtained based on an optimum relationship between the scarf angle $\theta_{scarf}$ and the effective incidence angle of attack α. The relationship between the scarf angle $\theta_{scarf}$ and the effective incidence angle of attack α is defined by the following equation:

$$\theta_{scarf} = \alpha \pm 1° \qquad \text{[Equation 3]}$$

A nacelle conforming to Equations 2 and 3, described above, may experience minimum drag. In some cases, the nacelle conforming to Equations 2 and 3 may be used in a UHBPR engine. A nacelle conforming to Equations 2 and 3 may have a drooped and scarfed non-axisymmetric configuration. In some cases, the drag may be minimised during mid-cruise conditions, for example, flight Mach numbers in the region of 0.85.

Figure 3:
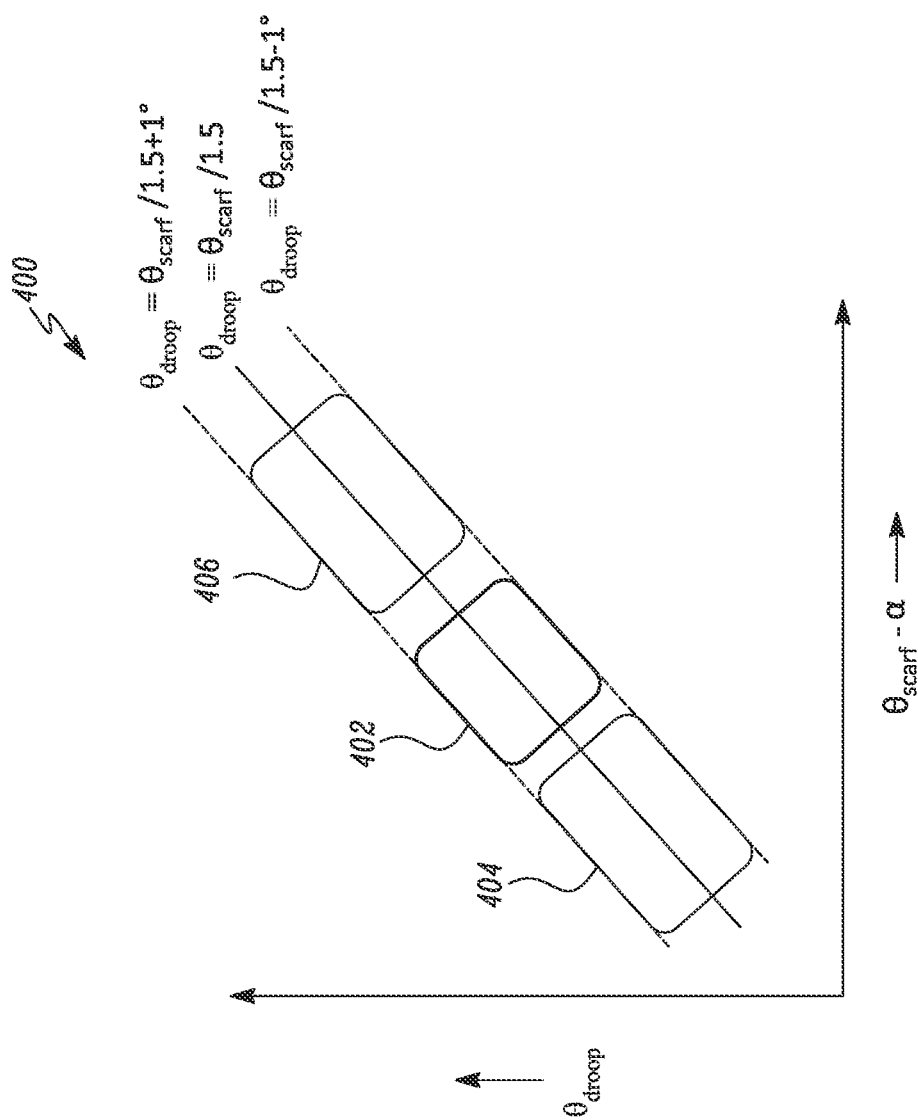
FIG. 3 is a graph illustrating an optimal region of a droop angle and a scarf angle.

FIG. 3 illustrates a graph 400 showing an optimal region 402 (shown by darkened lines) of the droop angle $\theta_{droop}$ and the scarf angle $\theta_{scarf}$. Specifically, the optimal region 402 may include ranges of optimal values of the droop angle $\theta_{droop}$ and the scarf angle $\theta_{scarf}$. The optimal range is based on Equations 2 and 3. The optimal range 402 may be substantially rectangular. The droop angle $\theta_{droop}$ is shown along the abscissa (Y-axis) and the difference between the scarf angle $\theta_{scarf}$ and the effective incidence angle of attack α is shown along the ordinate (X-axis). The associated arrows give, as is usual in graphs, the directions for values of increasing magnitude in the graph.

The optimal region 402 is bounded by lines $\theta_{droop}=\theta_{scarf}/1.5+1°$, $\theta_{droop}=\theta_{scarf}/1.5-1°$, $\theta_{scarf}-\alpha=-1°$, and $\theta_{scarf}-\alpha=+1°$. A line $\theta_{droop}=\theta_{scarf}/1.5$ bisects the optimal region 402. The optimal region 402 may minimise nacelle drag. Non-optimal regions 404, 406 located above and below, respectively, the optimal region 402 may increase nacelle drag as compared to the optimal region 402.

Figure 4:
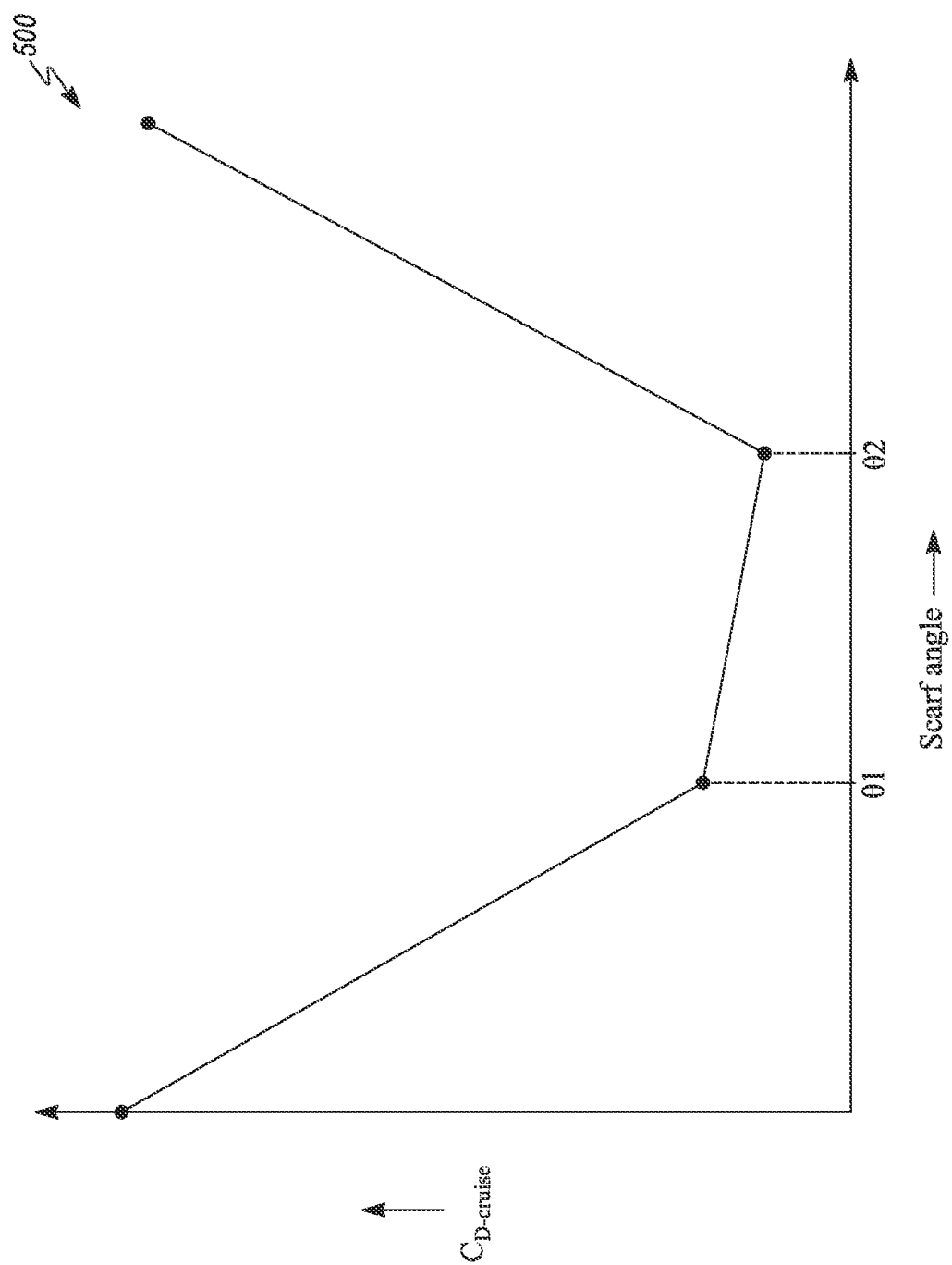
FIG. 4 is a graph illustrating a variation of a coefficient of cruise drag with the scarf angle.

FIG. 4 is a graph 500 illustrating a variation of a coefficient of cruise drag $C_{D-cruise}$ with the scarf angle $\theta_{scarf}$. The graph 500 depicts the coefficient of cruise drag $C_{D-cruise}$ along the abscissa (Y-axis) and the scarf angle $\theta_{scarf}$ along the ordinate (X-axis). As shown in the graph 500, a minimum range of the cruise drag $C_{D-cruise}$ is achieved when the scarf angle $\theta_{scarf}$ is greater than equal to θ1 and less than equal to θ2. In general, a minimum value or a minimum range of the coefficient of cruise drag $C_{D-cruise}$ may be achieved for a value or a range of the scarf angle $\theta_{scarf}$.

FIG. 4 may include any suitable range of the scarf angle $\theta_{scarf}$ of the nacelle 100. In some embodiments, a positive scarf angle $\theta_{scarf}$ of the nacelle 100 may be between about 2 degrees to about 5 degrees. In some other embodiments, the positive scarf angle $\theta_{scarf}$ of the nacelle 100 may be between about 2.5 degrees to about 4.5 degrees. In some other embodiments, the positive scarf angle $\theta_{scarf}$ of the nacelle 100 may be between about 1 degree to about 5 degrees.

Figure 5:
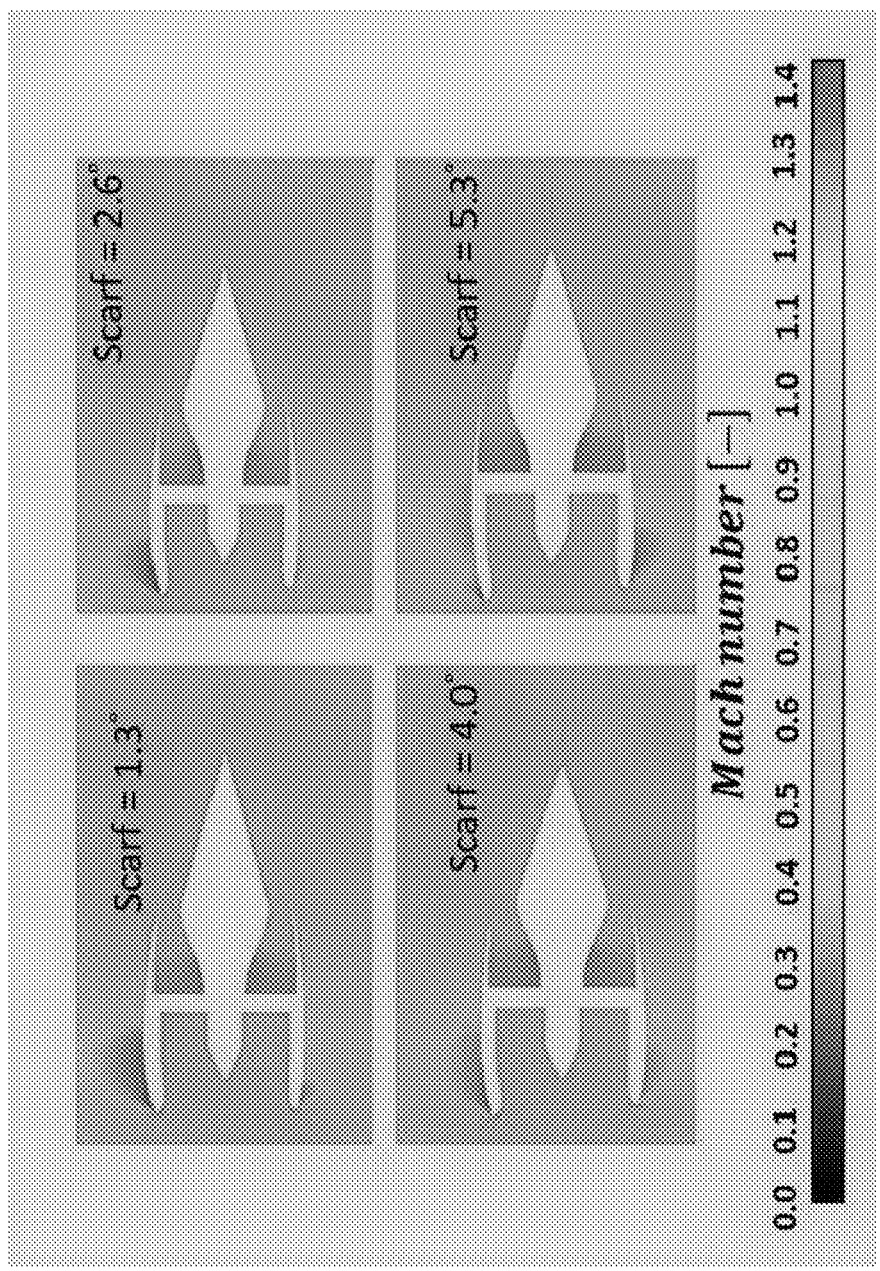
FIG. 5 is associated Mach number contours of a nacelle for different values of the scarf angle.

FIG. 5 shows associated Mach number contours of a nacelle for different values of the scarf angle $\theta_{scarf}$. As shown in FIG. 5, a cruise Mach number of the aircraft including the nacelle may be in the region of 0.85 Mach. In some embodiments, the cruise Mach number of the aircraft is from 0.8 Mach to 0.9 Mach. Mach number contours for scarf angle $\theta_{scarf}$ values of 1.3°, 2.6°, 4.0° and 5.3° are shown. As shown in FIG. 5, a cruise Mach number around the nacelle and flow separation may be reduced for scarf angle $\theta_{scarf}$ values of 2.6° and 4.0°. the values of the scarf angle $\theta_{scarf}$ shown in FIG. 5 are exemplary in nature and should not be construed as limiting the scope of the present disclosure.

Figures 6A, 6B:
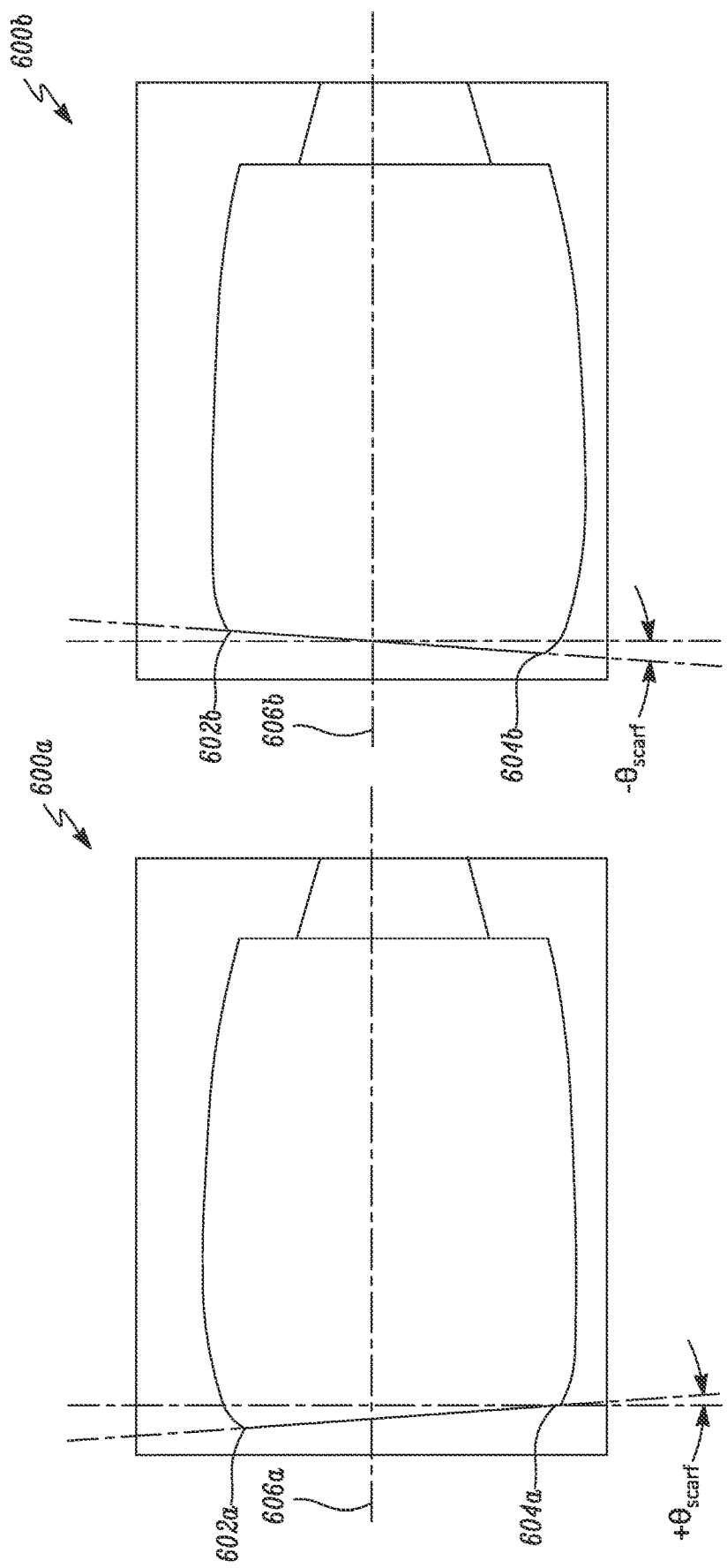
FIG. 6a is a side view of a nacelle with a positive scarf angle.
FIG. 6b is a side view of another nacelle with a negative scarf angle.

FIG. 6a illustrates a nacelle 600a having a positive scarf angle $\theta_{scarf}$. A crown leading edge 602a is axially forward of a keel leading edge 604a with reference to a longitudinal central line 606a. FIG. 6b illustrates a nacelle 600b having a negative scarf angle $\theta_{scarf}$. A keel leading edge 604b is axially forward of a crown leading edge 602b with reference to a longitudinal central line 606b.

Figure 7:
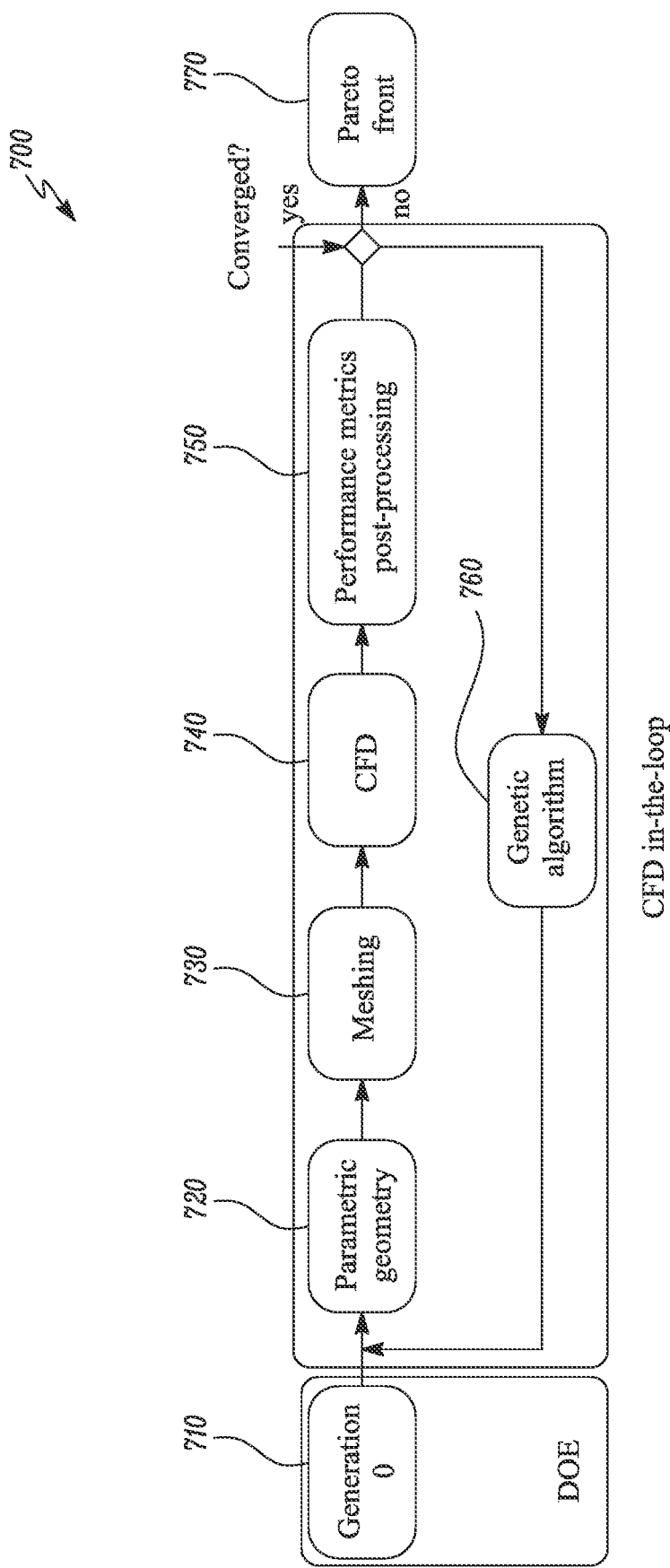
FIG. 7 is a block diagram depicting a multi-objective optimisation method for designing a nacelle.

FIG. 7 illustrates an exemplary multi-objective optimisation (MOO) process 700 to obtain optimized nacelle designs. At block 710, the MOO process 700 (hereinafter referred to as "the process 700") starts with a design of experiments (DOE). The design of experiments (DOE) may be based on Latin Hypercube Sampling (LHS), due to its proven capabilities to efficiently cover high dimensional spaces. The use of the design of experiments (DOE) methodology may provide a means to identify critical process parameters which impact mid-cruise drag. At block 720, the nacelle designs obtained from the DOE are parametrised. The nacelle designs obtained from the DOE may be parameterised using an intuitive Class Shape Transformation (CST) method with nacelle design variables, such as highlight radius, maximum radius, nacelle length, trailing edge radius, etc. At block 730, a mesh generation tool is deployed to construct a fully structured 3-D mesh of the nacelle. At block 740, computational fluid dynamics (CFD) simulations of the meshed nacelle designs are carried out. The drag is extracted or computed with a developed thrust-drag bookkeeping method. At block 750, performance metrics post-processing is carried out. At block 760, a new set of nacelle design variables are proposed by an evolutionary genetic algorithm and evaluated using the describe approach. The loop from block 720 to block 760 continues until reaching convergence to a block 770 which is a Pareto front.

Optimization of the design variables using the process 700 defines the optimised design variables suitable for an underwing-podded nacelle of an aircraft. The nacelle may preferably include an Ultra-High Bypass Ratio (UHBPR) engine. The aircraft has preferably a cruise Mach speed in a region of 0.85 Mach. It should be noted that the present disclosure does not limit the nacelle to be in an underwing-podded configuration. The present disclosure also does not limit the type of gas turbine engine used with the nacelle.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A nacelle for a gas turbine engine having a longitudinal centre line, the nacelle comprising:
   an intake lip disposed at an upstream end of the nacelle, the intake lip including a crown and a keel, the crown including a crown leading edge and the keel including a keel leading edge, the crown leading edge and the keel leading edge defining a scarf line therebetween, the scarf line forming a scarf angle (θscarf) relative to a reference line perpendicular to the longitudinal centre line; and
   a fan casing disposed downstream of the intake lip and including a casing leading edge, the casing leading edge facing an axial direction of the fan casing, the casing leading edge extending around an inner circumference of the fan casing, and the casing leading edge defining an upstream facing plane, wherein a droop line is defined normal to the upstream facing plane, and the droop line forms a droop angle (θdroop) relative to the longitudinal center line, to satisfy:

θdroop=(θscarf/1.5)±1 degree.

2. The nacelle of claim 1, wherein an effective incidence angle of attack (α) is defined relative to the longitudinal centre line, and wherein θscarf=α±1 degree.

3. The nacelle of claim 1, wherein the crown leading edge is axially forward of the keel leading edge relative to the longitudinal centre line.

4. The nacelle of claim 1, wherein the keel leading edge is axially forward of the crown leading edge relative to the longitudinal centre line.

5. The nacelle of claim 1, wherein the intake lip includes an outer surface, an inner surface, and a highlight forming a boundary between the outer surface and the inner surface, the highlight including the crown leading edge and the keel leading edge.

6. The nacelle of claim 1, further comprising an engine casing disposed downstream of the intake lip.

7. The nacelle of claim 1, further comprising a diffuser disposed between the upstream end and the fan casing.

8. The nacelle of claim 1, further comprising an exhaust disposed at a downstream end of the nacelle.

9. A gas turbine engine for an aircraft, the gas turbine engine comprising:
   the nacelle according to claim 1;
   a fan received within the fan casing of the nacelle; and
   a core engine received within the nacelle.

\* \* \* \* \*